United States Patent
Steele

(10) Patent No.: US 7,246,850 B2
(45) Date of Patent: Jul. 24, 2007

(54) SEAT WEIGHT SENSOR

(75) Inventor: Ryan N. Steele, Dearborn, MI (US)

(73) Assignee: TK Holdings Inc., Auburn Hills, MI (US)

( * ) Notice: Subject to any disclaimer, the term of this patent is extended or adjusted under 35 U.S.C. 154(b) by 5 days.

(21) Appl. No.: 11/220,545

(22) Filed: Sep. 8, 2005

(65) Prior Publication Data

US 2006/0061159 A1 Mar. 23, 2006

Related U.S. Application Data

(60) Provisional application No. 60/607,581, filed on Sep. 8, 2004.

(51) Int. Cl.
*A47C 7/62* (2006.01)
(52) U.S. Cl. ................ 297/217.2; 297/463.1; 297/463.2; 280/735
(58) Field of Classification Search ............ 297/217.2, 297/463.1, 463.2; 280/735
See application file for complete search history.

(56) References Cited

U.S. PATENT DOCUMENTS

| | | | | |
|---|---|---|---|---|
| 4,738,325 A | | 4/1988 | Bullivant et al. | |
| 5,739,757 A | * | 4/1998 | Gioutsos | 280/735 X |
| 5,831,342 A | * | 11/1998 | Vivacqua et al. | 280/735 X |
| 5,967,549 A | * | 10/1999 | Allen et al. | 280/735 |
| 6,069,325 A | | 5/2000 | Aoki | |
| 6,095,555 A | * | 8/2000 | Becker et al. | 280/735 |
| 6,129,168 A | | 10/2000 | Lotito et al. | |
| 6,275,026 B1 | * | 8/2001 | Becker | 280/735 X |
| 6,288,649 B1 | * | 9/2001 | Wolfe | 280/735 X |
| 6,323,444 B1 | | 11/2001 | Aoki | |
| 6,401,855 B1 | * | 6/2002 | Wolfe | 280/735 X |
| 6,448,512 B1 | * | 9/2002 | Cooper | 280/735 X |
| 6,508,514 B2 | * | 1/2003 | Wolfe | 297/463.1 |
| 6,583,367 B2 | * | 6/2003 | Wolfe et al. | 280/735 X |
| 6,617,531 B1 | * | 9/2003 | Aoki | 280/735 X |
| 6,685,218 B1 | * | 2/2004 | Breed et al. | 280/735 X |
| 6,831,537 B2 | * | 12/2004 | Haas et al. | 280/735 X |
| 6,835,899 B2 | * | 12/2004 | Wolfe et al. | 280/735 X |
| 6,854,782 B2 | * | 2/2005 | Reichert et al. | 280/735 X |
| 6,870,366 B1 | * | 3/2005 | Becker et al. | 280/735 X |
| 6,903,280 B2 | * | 6/2005 | Selig et al. | 280/735 X |
| 6,916,997 B2 | * | 7/2005 | Thakur et al. | 280/735 X |
| 6,921,107 B2 | * | 7/2005 | Mills et al. | 280/735 |
| 6,987,229 B2 | * | 1/2006 | Murphy | 280/735 X |
| 2006/0181119 A1 | * | 8/2006 | Wolfe et al. | 297/217.2 |

FOREIGN PATENT DOCUMENTS

WO    WO2004/003501 A1    1/2004

* cited by examiner

*Primary Examiner*—Rodney B. White
(74) *Attorney, Agent, or Firm*—Foley & Lardner LLP

(57) ABSTRACT

A seat weight sensor for detecting the load upon a vehicle seat. The seat weight sensor includes a seat rail positioned under the vehicle seat. A lever arm is mounted to the vehicle seat. One end of the lever arm has one or more stationary fingers and a free finger. The stationary fingers are rigidly mounted to the seat rail. The lever arm bends in relation to the force placed upon the seat that in turn places the free finger in motion. A sensor is mounted to the seat rail and is configured to measure the change in motion of the free finger when a force is placed upon the seat.

18 Claims, 7 Drawing Sheets

SEAT WEIGHT SENSOR

CROSS-REFERENCE TO RELATED PATENT APPLICATIONS

This application claims the benefit of U.S. patent application Ser. No. 60/607,581, under 35 U.S.C. § 119(e). U.S. patent application Ser. No. 60/607,581 was filed Sep. 8, 2004, and is incorporated herein by reference in its entirety.

BACKGROUND

The present invention relates generally to the field of vehicle occupant systems. Specifically, the present invention relates to an occupant seat weight sensor.

U.S. Pat. Nos. 6,323,444 and 6,069,325 describe seat weight monitoring devices and are herein incorporated by reference. Both patents teach the use of a load monitoring device and a plurality of arms that are horizontally supported by pivots. The load monitoring device uses the arms movement to derive information useful in determining the load placed on a vehicle seat.

Current seat weight sensor ("SWS") technology generally includes an apparatus that is configured in a U-shaped rail. Typically, the U-shaped rail contains two sensors or strain gauges. In a vehicle, two rails are mounted under each seat. Accordingly, the SWS measures the total seat weight under each corner of the seat. Other design features of the current SWS include the ability to carry structural loads so that the sensor and lever are not damaged during a vehicle crash.

Unfortunately, strain gauges can be difficult to implement because they are very sensitive to forces that are not intended to be measured. In addition, strain gauges are expensive and therefore increase production costs. Thus, an inexpensive seat weight sensor is needed that is effective at detecting and isolating the specific forces related to the load placed upon a vehicle seat.

SUMMARY

According to one embodiment of the invention, a seat weight sensor, includes a seat rail positioned under a vehicle seat, a lever arm, wherein a first end of a lever arm includes a free finger and one or more stationary fingers, wherein the one or more stationary fingers are mounted to the seat rail such that the end of the stationary fingers cannot move vertically and a second end of the lever arm is rigidly mounted to the seat rail. A sensor is mounted to the seat rail, wherein the sensor detects changes in the movement of the free finger when a force is applied to the seat.

According to another embodiment of the invention, a seat weight sensor includes a lever arm, wherein the first end of a lever arm includes a free finger and one or more stationary fingers, wherein the one or more stationary fingers are mounted to a seat track of a vehicle seat such that the end of the fingers cannot move vertically and a second end of a lever arm is mounted to the vehicle such that the second end cannot move vertically. A sensor detects changes in the movement of the free finger when a force is applied to the seat.

According to still another embodiment of the invention, a seat weight sensor system, includes a vehicle seat, a seat rail positioned under the vehicle seat, one or more lever arms, wherein a first end of a lever arm includes a free finger and one or more stationary fingers, wherein the one or more stationary fingers are mounted to the seat rail such that the end of the stationary fingers cannot move vertically and a second end of the lever arm is rigidly mounted to the seat rail. A sensor is mounted to the seat rail, wherein the sensor detects changes in the movement of the free finger when a force is applied to the seat and generates an electric signal. A processor is configured to receive and convert the electrical signal into a force value.

According to still another embodiment of the invention, a seat weight sensor system, includes a vehicle seat, one or more lever arms, wherein a first end of a lever arm includes a free finger and one or more stationary fingers, wherein one or more stationary fingers are mounted to the seat track such that the end of the stationary fingers cannot move in the vertical direction and a second end of a lever arm is mounted to the vehicle such that the second end cannot move vertically. A sensor is mounted to the seat track, wherein the sensor detects changes in the movement of the free finger when a force is applied to the seat. Accordingly, the sensor generates an electric signal. A processor is configured to receive and convert the electrical signal to a force value.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DESCRIPTION

Embodiments of the present invention will be described below with reference to the accompanying drawings. It should be understood that the following description is intended to describe exemplary embodiments of the invention, and not to limit the invention.

Figure 1A:
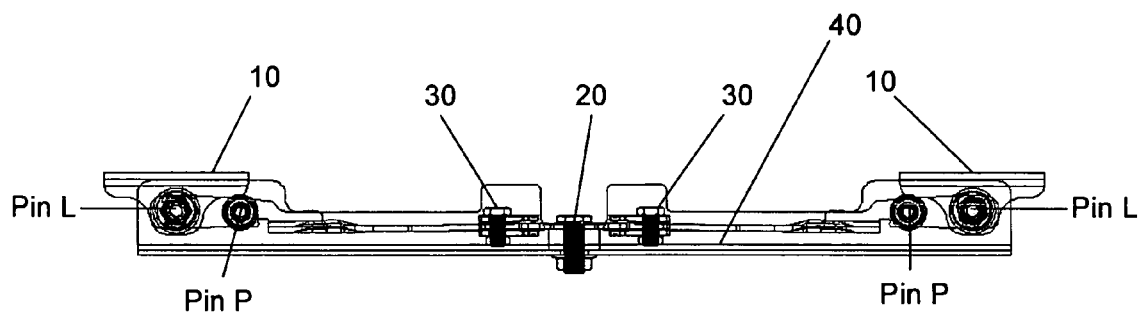
FIGS. 1(a)-(b) is a side view and top view of a prior art seat weight sensor.
Figure 1B:
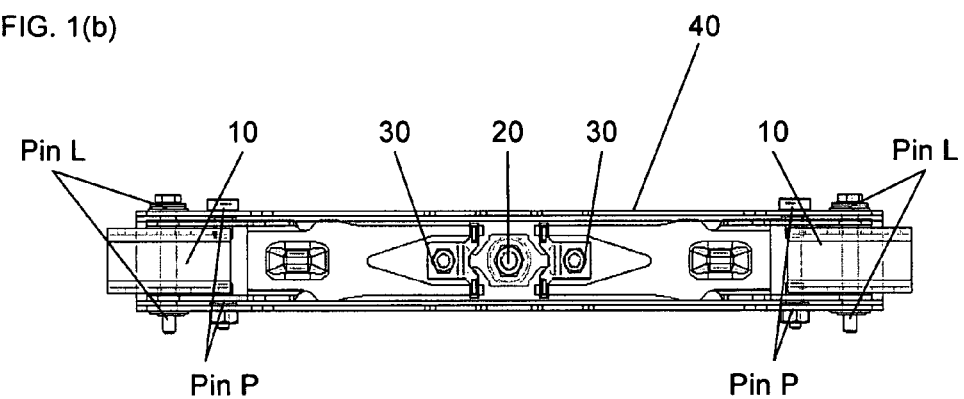

FIG. 1 illustrates an embodiment of a current SWS design. As the design is generally symmetrical, the following description is limited to one-half of the rail 40. The applied force from the seat (not shown) plus the occupant pushes down on the short end of the lever arm 10 at Pin L. This force causes the lever to rotate about Pin P. As the lever rotates, a force is applied to the sensor plate 20 (measured force), which causes the plate 20 to bend. The bend of the plate 20 is measured electronically by strain gauges 30 on the sensor plate 20.

In the above-described system, the strain gauges 30 and the lever 10 are the mechanisms that allow a weight measurement to be obtained. The lever 10 hinges on a pin P that is off-center in relation to the lever 10. This off-center pin P attaches the lever 10 to the rail 40. At the short end of the lever 10, another pin joint L attaches to the corner of the vehicle seat. As shown in FIG. 1(*b*), the long end of the lever 10 splits into two fingers, which are both connected on opposing sides of the strain gauge sensor 30. As weight is placed on the seat, the short end of the lever 10 is forced downward, which rotates the lever arm 10 about the pin P, which causes a force at the other end of the lever 10. This force is measured by the strain gauges 30. In the existing design, the lever arms 10 are used only to transfer the load to the sensor plate 20. In turn, strain gauges 30 are used to monitor the sensor plate 20.

The present invention is a seat weight sensor that is configured to measure the deflection of the existing lever arms in a simple package with reduced parts and cost.

Figure 2A:
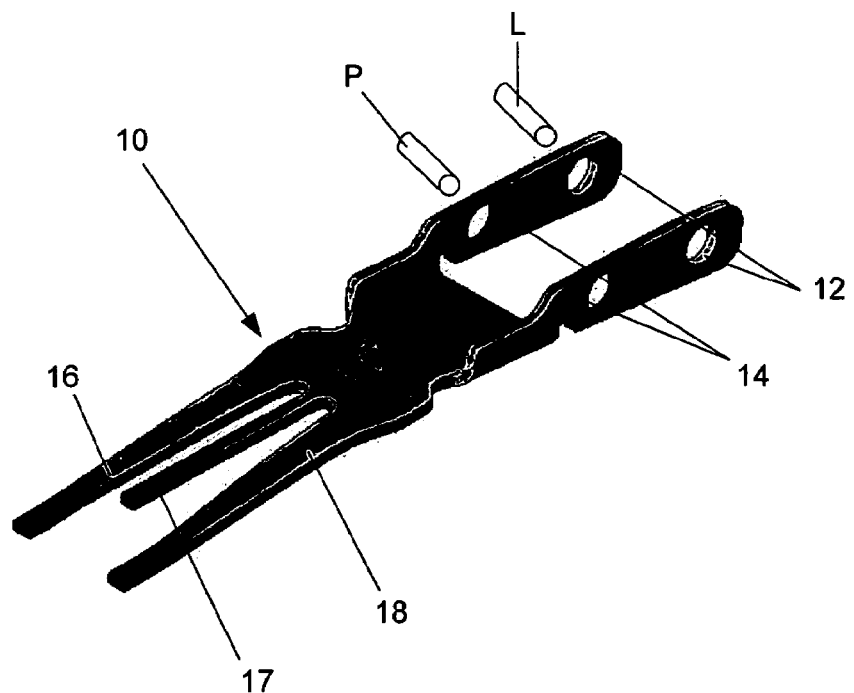
FIG. 2(a) is a perspective view of a lever arm according to one embodiment of the invention.
Figure 2B:
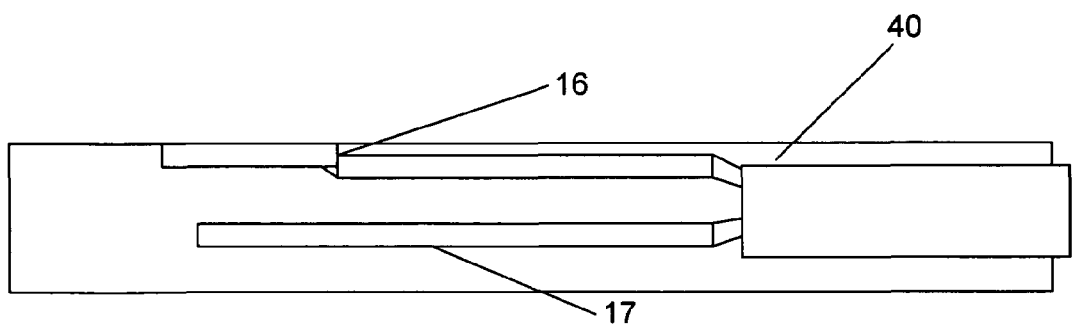
FIG. 2(b) is a top view of a lever arm and a seat rail according to one embodiment of the invention.

FIG. 2(*a*) illustrates a lever arm 10 according to one embodiment of the present invention. The lever arms 10 are composed of a material that has elastic properties. The material allows the lever arms 10 to exhibit spring-like properties. Since the lever arms 10 exhibit spring like bending, a function can be developed to transfer deflection to the force applied to the seat. The lever arm 10 is rigidly mounted to the seat rail 40 such that the lever arm 10 will flex under an applied load.

As shown in FIG. 2(*a*) and according to one embodiment of the invention, the lever arm 10 has a first pinhole 12 and a second pinhole 14. In this embodiment, the lever arm 10 is mounted to a seat rail 40 by Pins L, which are placed through pinholes 12. The pinholes 14 allow the lever arm 10 to pivot about Pins P. The two tips of stationary fingers 16, 18 at the long end of the lever 10 are attached to the seat rail 40 such that the end of the stationary fingers 16, 18 cannot move vertically.

As shown in FIG. 2(*a*), the shape of the lever arm of the present invention provides for easy packaging of the seat weight sensor without further changes to the rail assembly 40, while continuing to take full advantage of the force-filtering benefits of the lever 10.

According to another embodiment of the invention, as shown in FIG. 2(*b*), the lever arm 10 is comprised of one stationary finger 16 mounted rigidly to the seat rail 40 and a free finger 17.

Figure 3:
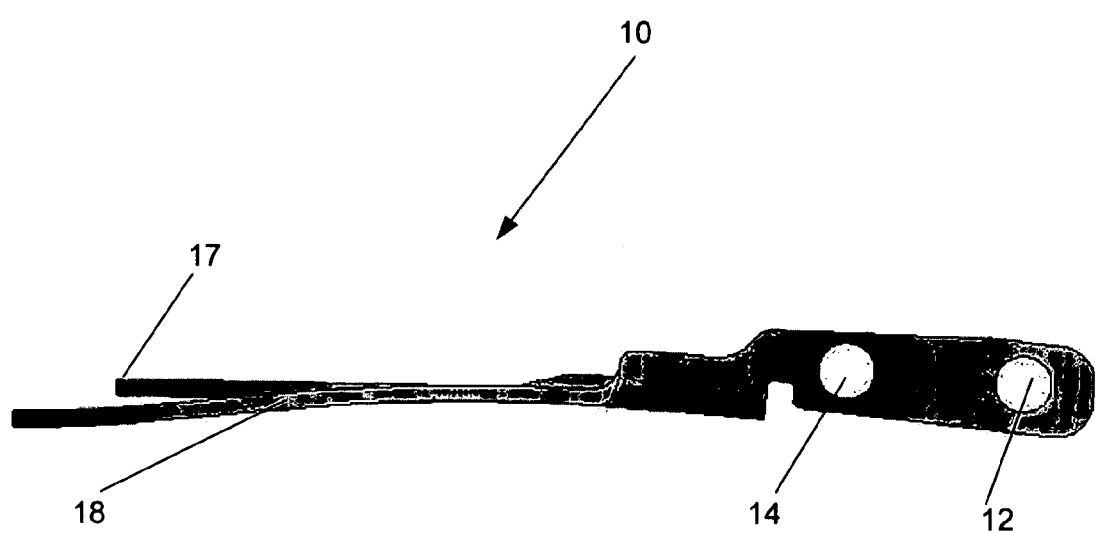
FIG. 3 is a side view of a lever arm according to one embodiment of the invention.

As force is applied to the seat, the lever arm 10 bends or bows. According to one embodiment of the invention, the lever arm 10 rotates about Pin P, causing the lever arm 10 to bend or bow. A free finger 17 of the lever arm 10 will then move in the direction that the lever 10 has bowed, as shown in FIG. 3. Since the ratio between the long and short ends of the lever arm 10 is approximately 4:1, a relatively small movement of 1 mm at the short end will cause the free finger 17 at the long end to move about 3 to 4 mm. This ratio can be optimized depending on the length of the free finger 17 and the geometry of the lever 10. The deflection of the free finger 17 is measured by a sensor 50. According to one embodiment of the invention, the sensor 50 is a Hall Effect sensor. Accordingly, the larger deflection of the free finger 17 can be measured easily and with good resolution by a Hall Effect sensor 50.

The operation of an embodiment of the seat weight sensor will now be described with regard to FIG. 4. According to this embodiment, the applied force at Pin L again rotates the lever 10 about the Pin P. The lever resists this motion with the force, $F=kx$, where k is assumed to be a linear spring constant for a bending spring, and x is the measurable deflection of the long end of the lever 10. The lever 10 acts as a spring because the stationary 'fingers' 16, 18 on the lever arm 10 are fixed to the rail 40 such that the end of the stationary fingers cannot move vertically.

Figure 4:
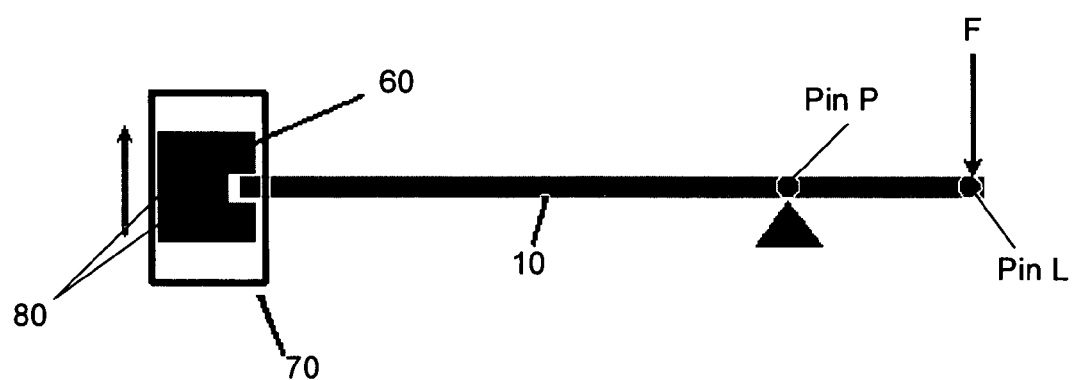
FIG. 4 is a block diagram illustrating the operation of the seat weight sensor according to one embodiment of the invention.

According to one embodiment of the invention, as shown in FIG. 4, the free finger 17 on the lever 10 may be connected to a plunger 60. The plunger 60 is held within a guide or track 70 of a preferred geometry that allows the plunger 60 to only move vertically. The free-floating plunger 60 is held by the lever 10 within the guide 70 and requires no additional spring loads. The plunger 60 holds one or more magnets 80 designed to provide an optimum magnetic field to be measured by a Hall Effect sensor 50.

The Hall Effect sensor 50 is mounted to the rail 40 within the magnetic field generated by the magnets 80. As the lever 10 bends or bows under the applied load (positive or negative), the free finger 17 moves in the direction of the bending. In turn, the plunger 60 moves vertically (positively or negatively) within the plunger guide 70. Accordingly, the sensor 50 is able to detect the movement of the free finger 17 based on the change in magnetic field due to the movement of the magnets 80 located inside the plunger 60.

Alternatively, the free finger 17 is not connected to a plunger 60. In this embodiment, the free finger 17 may be composed of a ferromagnetic material such that a sensor 50 is able to detect the displacement of the free finger 17. According to another embodiment of the invention, magnets are positioned on the surface of or inside of the free finger 17.

Figure 5:
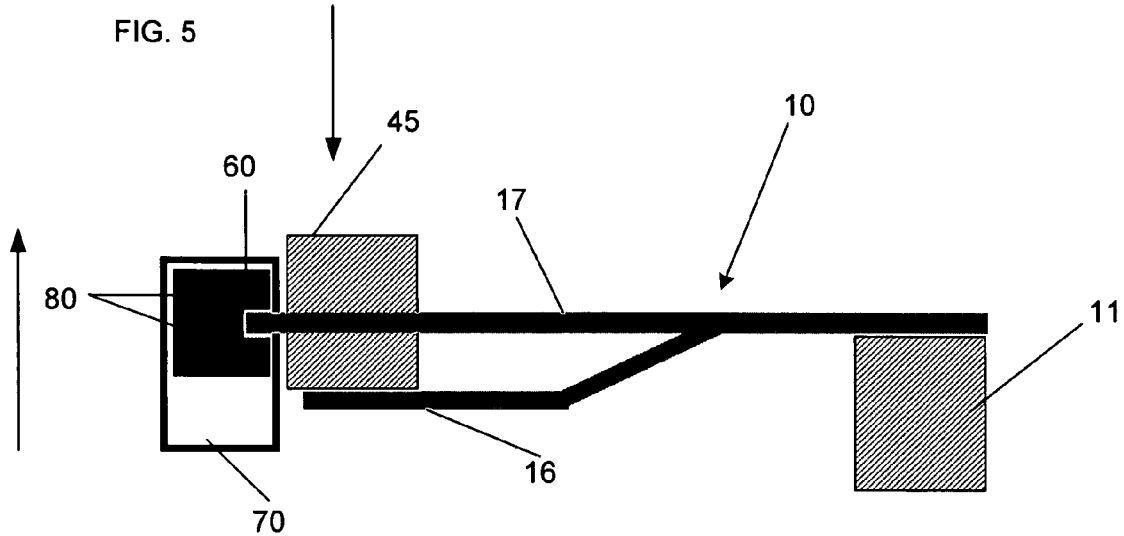
FIG. 5 is a block diagram of a seat weight sensor according to one embodiment of the invention.

FIG. 5 shows another embodiment of the seat weight sensor. One end of the lever arm 10 is rigidly mounted to a vehicle mount 11. The vehicle mount 11 is positioned between the vehicle floor and a vehicle seat. According to another embodiment of the invention, one end of the lever arm 10 is mounted to the vehicle mount 11 rigidly, semi-rigidly or with one or more pins such that the mounting would allow the lever arm 10 to flex under a load. A stationary finger 16 is connected to the opposing end of the lever arm 10 and positioned to receive the applied force from a seat mount 45.

According to one embodiment of the invention, as described above, a plunger 60 may be connected to the end of a free finger 17. Alternatively, the free finger 17 is not connected to a plunger 60. In this embodiment, the free finger 17 may be composed of a ferromagnetic material such that a sensor 50 is able to detect the displacement of the free finger 17. According to another embodiment of the invention, magnets are positioned on the surface of, or inside of the lever arm 10. According to still another embodiment of the invention, magnets are positioned on the surface of or inside of the free finger 17.

During operation, when a force is applied to the seat mount 45, a measurable displacement is created along the lever arm 10. As shown in FIG. 5, the displacement between the free finger 17 and stationary finger 16 can be measured using a sensor 50. According to one embodiment of the invention, the sensor 50 is mounted to the seat track of the vehicle seat. Alternatively, the sensor 50 is mounted to the stationary finger 16.

Figure 6:
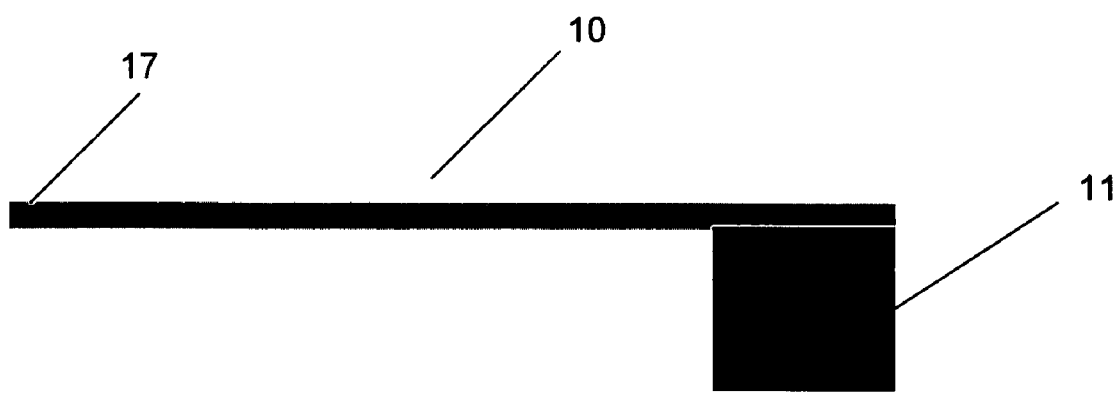
FIG. 6 is a block diagram of a seat weight sensor according to one embodiment of the invention.

FIG. 6 shows a seat weight sensor according to another embodiment of the invention. The seat weight sensor has a lever arm 10 mounted rigidly between a vehicle floor and the seat such that when a force is applied to the vehicle seat the lever arm 10 is displaced. According to one embodiment of the invention, the lever arm 10 is comprised of ferromagnetic material such that a sensor 50 positioned near the lever arm 10 may detect a displacement in the lever arm 10. According to another embodiment of the invention, magnets are positioned on the surface of, or inside of the lever arm 10. According to still another embodiment of the invention, magnets are positioned on the surface of or inside of the free finger 17, which in this embodiment is the end of the lever arm 10 that is not fixed.

Figure 7:
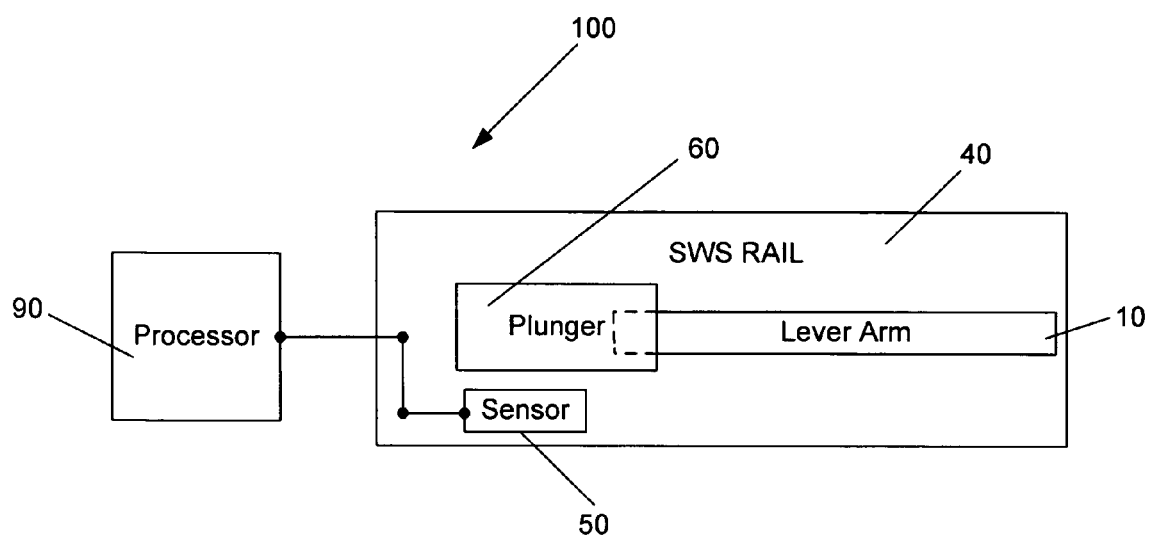
FIG. 7 is a block diagram of a seat weight sensor system according to one embodiment of the invention.

A seat weight sensor system 100 is depicted in FIG. 7. As the free finger 17 moves vertically, the magnetic field changes with respect to the Hall Effect sensor 50. This change in the magnetic field is measured electrically. The electrical signal is sent to an electronic processor 90 and is converted to a force value.

The present invention is not limited to the Hall Effect sensor 50 configuration described above. According to another embodiment of the present invention, inductive sensing in which the magnetically permeable free finger 17 passes by one or more of displacement sensors. The displacement sensors may be coils or looped conductors that change impedance when permeable or conductive objects move in an area near the position of the displacement sensors. Some of the displacement sensors will create a magnetic field, while others will measure the change as the free finger 17 passes through the magnetic field. As the field changes, the position of the free finger 17 is determined by a displacement sensor.

The above-described invention has several advantages. The current SWS lever may be used as a spring, whose displacement is measurable via a displacement sensor, such as a Hall Effect sensor. The method of detection employed by the present invention results in a small number of required system components. In addition, the required system components are inexpensive and readily available. Accordingly, production costs of the seat weight sensor are decreased.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A seat weight sensor, comprising:
   a seat rail positioned under a vehicle seat;
   a lever arm, wherein a first end of the lever arm includes a free finger and one or more stationary fingers, wherein the one or more stationary fingers are mounted to the seat rail such that the end of the stationary fingers cannot move vertically and a second end of the lever arm, rigidly mounted to the seat rail;
   a sensor, mounted to the seat rail;
   a plunger, connected to the free finger, wherein the plunger is positioned within a housing so that its movement is restricted to the vertical axis; and
   one or more magnets positioned inside the plunger, wherein the sensor detects changes in a magnetic field created by the magnets when the plunger is put in motion by the free finger.

2. A seat weight sensor as claimed in claim 1, wherein the sensor is a Hall Effect sensor.

3. A seat weight sensor as claimed in claim 1, wherein the lever arm is composed of an elastic material.

4. A seat weight sensor, comprising:
   a seat rail positioned under a vehicle seat;
   a lever arm, wherein a first end of the lever arm includes a free finger and one or more stationary fingers, wherein the one or more stationary fingers are mounted to the seat rail such that the end of the stationary fingers cannot move vertically and a second end of the lever arm, rigidly mounted to the seat rail; and
   a sensor, mounted to the seat rail, wherein a first pin attaches the second end of the lever arm to the seat rail so that the lever arm may pivot relative to the rail and a second pin attaches the second end of the lever arm to the seat rail at a corner of the vehicle seat.

5. A seat weight sensor as claimed in claim 4, further comprising:
   a plunger, connected to the free finger, wherein the plunger is positioned within a housing so that its movement is restricted to the vertical axis; and
   one or more magnets positioned inside the plunger, wherein the sensor detects changes in a magnetic field created by the magnets when the plunger is put in motion by the free finger.

6. A seat weight sensor as claimed in claim 5, wherein the magnets are configured to provide a magnetic field to be measured by the sensor.

7. A seat weight sensor as claimed in claim 4, wherein when force is applied at the second pin, the lever arm will pivot around the first pin.

8. A seat weight sensor, comprising:
   a seat rail positioned under a vehicle seat;
   a lever arm, wherein a first end of the lever arm includes a free finger and one or more stationary fingers, wherein the one or more stationary fingers are mounted to the seat rail such that the end of the fingers cannot move vertically and a second end of the lever arm, rigidly mounted to the seat rail;
   one or more of displacement sensors mounted to the seat rail, wherein the displacement sensors are used to detect the position of the free finger;
   a plunger, connected to the free finger, wherein the plunger is positioned within a housing so that its movement is restricted to the vertical axis; and
   one or more magnets positioned inside the plunger, wherein the sensor detects changes in a magnetic field created by the magnets when the plunger is put in motion by the free finger.

9. A seat weight sensor system, comprising:
   a vehicle seat;
   one or more seat rails positioned under the vehicle seat;
   one or more lever arms, wherein a first end of the lever arm includes an free finger and one or more stationary fingers, wherein the one or more stationary fingers are mounted to the seat rail such that the end of the fingers cannot move vertically and a second end of the lever arm, rigidly mounted to the seat rail;

a sensor mounted to the seat rail, wherein the sensor detects changes in the movement of the free finger when a force is applied to the seat and generates an electric signal;

a processor, configured to receive and convert the electrical signal into a force value;

a plunger, connected to the free finger, wherein the plunger is positioned within a housing so that its movement is restricted to the vertical axis; and one or more magnets positioned inside the plunger, wherein the sensor detects changes in a magnetic field created by the magnets when the plunger is put in motion by the free finger.

10. A seat weight sensor for a vehicle, comprising:

a lever arm, wherein the first end of a lever arm includes a free finger and one or more stationary fingers, wherein the one or more stationary fingers are mounted to a seat track of a vehicle seat such that the end of the fingers cannot move vertically and a second end of a lever arm is mounted to the vehicle such that the second end cannot move vertically;

a sensor, wherein the sensor detects changes in the movement of the free finger when a force is applied to the seat;

a plunger, connected to the free finger, wherein the plunger is positioned within a housing so that its movement is restricted to the vertical axis; and one or more magnets positioned inside the plunger, wherein the sensor detects changes in a magnetic field created by the magnets when the plunger is put in motion by the free finger.

11. A seat weight sensor for a vehicle as claimed in claim 10, further comprising:

a sensor mounted to the seat track, wherein the sensor detects changes in the movement of the free finger when a force is applied to the seat.

12. A seat weight sensor for a vehicle as claimed in claim 10, further comprising:

a sensor mounted to the one or more stationary fingers, wherein the sensor detects changes in the movement of the free finger when a force is applied to the seat.

13. A seat weight sensor for a vehicle as claimed in claim 10, wherein the magnets are configured to provide a magnetic field to be measured by the sensor.

14. A seat weight sensor for a vehicle as claimed in claim 10, wherein the sensor is a Hall Effect sensor.

15. A seat weight sensor for a vehicle as claimed in claim 10, wherein the lever arm is composed of an elastic material.

16. A seat weight sensor system, comprising:

a vehicle seat;

one or more of lever arms, wherein the first end of a lever arm includes a free finger and one or more stationary fingers, wherein the one or more stationary fingers are mounted to a seat track of the vehicle seat such that the end of the fingers cannot move vertically and a second end of a lever arm is mounted to the vehicle such that it cannot move vertically;

a sensor mounted to the seat track, wherein the sensor detects changes in the movement of the free finger when a force is applied to the seat; and a processor, configured to receive and convert the electrical signal into a force value;

a plunger, connected to the free finger, wherein the plunger is positioned within a housing so that its movement is restricted to the vertical axis; and one or more magnets positioned inside the plunger, wherein the sensor detects changes in a magnetic field created by the magnets when the plunger is put in motion by the free finger.

17. A seat weight sensor system according to claim 16, further comprising:

a sensor mounted to the one or more stationary fingers, wherein the sensor detects changes in the movement of the free finger when a force is applied to the seat.

18. A seat weight sensor comprising:

a lever arm, wherein a first end of the lever arm includes a free finger and a second end of the lever arm is rigidly mounted to a vehicle mount positioned between a vehicle floor and a vehicle seat; and a sensor mounted to the vehicle, wherein the sensor detects changes in the movement of the free finger when a force is applied to the seat;

a plunger, connected to the free finger, wherein the plunger is positioned within a housing so that its movement is restricted to the vertical axis; and one or more magnets positioned inside the plunger, wherein the sensor detects changes in a magnetic field created by the magnets when the plunger is put in motion by the free finger.

* * * * *